Sept. 10, 1963
R. TEXTROM
3,103,126
LINK ASSEMBLY
Filed June 18, 1962
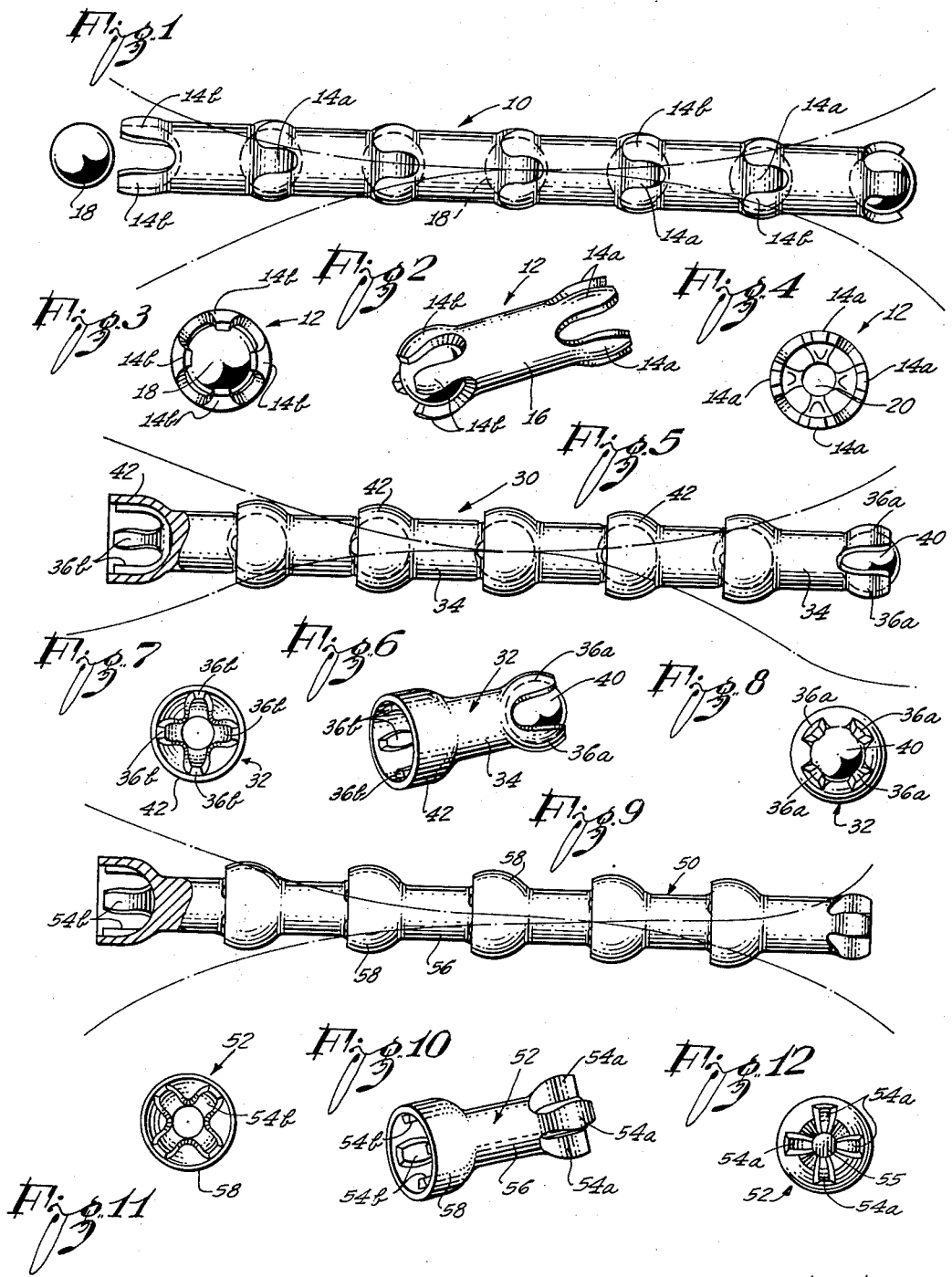
INVENTOR:
Ralph Textrom
By Keith D. Beecher
Attorney

United States Patent Office 3,103,126
Patented Sept. 10, 1963

3,103,126
LINK ASSEMBLY
Ralph Textrom, 510 Santa Ana, Newport Beach, Calif.
Filed June 18, 1962, Ser. No. 203,270
3 Claims. (Cl. 74—246)

The present invention relates to a flexible link assembly which may be used as a chain, or as flexible shafting.

A chain constructed in accordance with the concepts of the invention may be used, for example, for power drive purposes, as an indexing means, as a synchronizing means, as a conveying means, and for other purposes too numerous to list. Chains constructed in accordance with the concepts of the invention find particular utility in electronic or electromechanical drive systems.

When the link assembly of the invention is used as a flexible shafting, on the other hand, it is capable of transmitting high torques with a minimum of backlash.

It is, accordingly, a general object of the invention to provide an improved link assembly which is light in weight, and yet which is extremely strong and rugged.

Another object is to provide such an improved link assembly which may be manufactured rapidly and inexpensively, and by the use of simple and low cost fabricating machinery.

The link assembly of the invention is made up, in the embodiment to be described, of a plurality of involute gear links, composed of metal or plastic, which are constructed to mesh positively with one another both in a straight line and at any angle within a predetermined range. This range may extend, for example, from zero degrees to fifteen degrees.

The gear links of the assembly of the invention are held in mesh with one another, in a first embodiment, by means of spherical ball-shaped members. In this embodiment of the invention, the gear teeth of adjacent links are formed in an inter-leaved meshed relationship over an interposed ball member which is encompassed by the gear teeth. The teeth of the adjacent links are closed around the ball which serves as a coupling member to hold the two adjacent links together. The teeth are constructed to mesh positively with one another after being closed around the ball throughout the predetermined angular range, as noted above.

In another embodiment of the invention, the spherical ball member is made integral with the link at one end thereof. The teeth at the opposite end of the particular link are formed over the integral ball of the next adjacent link in meshing relationship with the teeth formed over the latter ball.

In the latter embodiment, the first end of each link has teeth formed in an involute gear configuration around the integral ball, and the other end of the link has teeth formed as an involute gear similar to the teeth of the previous embodiment.

In this second embodiment, the assembly is formed by simply closing the teeth at the one end of each link around the integral ball at the other end of an adjacent link and between the teeth of the adjacent link. The teeth, in each instance, are formed and shaped with an involute configuration to engage and mesh positively with one another through the aforementioned predetermined angular range.

In a third embodiment the aforementioned spherical ball is made integral with the teeth at one end of each link, as in the previous embodiment, so that the teeth at this particular end are formed into an involute gear around the integral ball. In this third embodiment, however, the outside surfaces of the involute gear teeth are formed to define a spherical surface.

The other end of each link in this third embodiment has involute gear teeth similar to the link of the first embodiment. However, in this latter embodiment, the teeth are reinforced by an external integral sleeve. To assemble the link assembly, the teeth and sleeve of each link are simultaneously formed over the ball and teeth of the adjacent link.

The last mentioned embodiment has a double reinforcement at each joint, by virtue of the engagement of the teeth of one link and ball of the adjacent link, and of the sleeve of the first link and teeth of the adjacent link. The sleeve, upon being formed over the ball and teeth of the adjacent link becomes spherical inside and out.

In a still further embodiment, the aforementioned ball is omitted, and the sleeve alone is used to couple the adjacent links of the assembly to one another. In this latter embodiment the teeth of each link are formed as involute gears, as in the previous embodiments. At one end of the link, the teeth are configured to have spherical outer faces so as to define a spherical surface, and at the other end the teeth are surrounded by an integral sleeve.

The above-mentioned embodiment is predicated on the realization that the ball is in reality superfluous, except insofar as it adds to the strength of the assembly; and that the teeth may be joined around any kind of center which provides the proper clearance. The center may have an axial passage extending through it, for example, to facilitate pressurized lubrication of the assembly.

In the embodiments mentioned above and to be described, each link is shown as having four teeth at each end, these teeth forming the aforementioned involute gears. It will be apparent as the description proceeds that the number of teeth is not critical.

It will also be observed that in the illustrated embodiments of the invention the teeth at one end of each link are angularly displaced from the teeth at the other end, so that the teeth at one end have a staggered offset relationship with respect to the teeth at the other end.

That is, the space between any two teeth at one end of a link is substantially axially aligned with a tooth at the other end. This staggered relationship of the teeth at the opposite ends of the links facilitates forming the links; since it permits a lengthwise cold forming operation to be carried out, with the excess material from one end of the link being used to form a corresponding tooth at the other end.

In order to eliminate any residual backlash in the assemblies of the invention when used as flexible shafting, slight taper variations in the gear teeth from the true involute shape may be imparted to the teeth to compensate for any residual relative angular movements between the links.

Other features, advantages and embodiments of the invention will become apparent from a consideration of the following specification, when taken in conjunction with the accompanying drawing, in which:

FIGURE 1 is a link assembly constructed in accordance with one embodiment of the invention, and in which the adjacent links are coupled by means of spherical ball-shaped members;

FIGURE 2 is a link which may be used in the assembly of FIGURE 1, the link of FIGURE 2 showing a spherical ball grasped at one end of the link, which ball may be integral with the link, or separate therefrom, as will be described;

FIGURE 3 is an end view of the link of FIGURE 2, taken from the left hand end of FIGURE 2;

FIGURE 4 is an end view of the link of FIGURE 2, taken from the right hand end of FIGURE 2;

FIGURE 5 is a link assembly constructed in accordance with a second embodiment of the invention, and which incorporates a reinforcing sleeve-shaped coupling means which is formed integral with one end of each link;

FIGURE 6 is a perspective view of a link from the assembly of FIGURE 5;

FIGURE 7 is an end view of the left hand end of the link of FIGURE 6;

FIGURE 8 is an end view of the right hand end of the link of FIGURE 6;

FIGURE 9 is a link assembly constructed in accordance with a third embodiment of the invention, and in which the adjacent links are coupled together by means of spherical sleeve members;

FIGURE 10 is a perspective view of a link from the assembly of FIGURE 9; and

FIGURES 11 and 12 are respective end views of the link of FIGURE 10.

The link assembly of FIGURE 1 is made up of a plurality of links designated generally as 10. The illustrated link assembly, as explained above, is well suited for use as a chain of the "ball and socket" type. In addition, and probably more importantly, the improved assembly of FIGURE 1 is particularly suited for use as flexible shafting.

Each of the links in the assembly 10 may have the configuration shown in FIGURES 2, 3 and 4, as mentioned above. The illustrated link is designated generally as 12. As illustrated in FIGURES 2, 3, and 4, the link 12 has gear teeth formed at each end thereof, these being designated at 14a and 13b. The link 12 has a shank portion 16, and the teeth 14a and 14b are formed at the respective ends of the shank portion. These teeth extend longitudinally as illustrated, and they are spaced radially from the longitudinal axis of the shank portion.

The teeth 14a and 14b have an involute configuration, and they are constructed to mesh with the teeth of the next adjacent link, as shown in FIGURE 1. The involute configuration of the teeth permits meshing thereof through a predetermined angular range of the assembly. This range, as mentioned above, may extend from zero to fifteen degrees.

In the embodiment of FIGURES 1–4, the adjacent links are coupled together by means of a plurality of spherical ball-shaped members, such as the ball 18 in FIGURES 1 and 3. The ball 18, shown in FIGURE 3, is disposed within the teeth 14b and is encompassed by the teeth. Also noted above, this ball may be formed integral with the teeth 14b.

To assemble the embodiment of FIGURE 1, the teeth 14a of each link are formed over the ball 18 and between the teeth 14b of an adjacent link. This forming operation can be formed simply and conveniently, and by means of suitable high speed automatic forming machinery. When the teeth 14a are so formed over the ball 18 of the adjacent link, the links are held coupled together firmly and rigidly by the ball 18. However, the teeth 14a are still free to move along particular paths relative to the ball 18, in a meshing relationship with the teeth 14b and through the predetermined angular range.

As shown in FIGURE 4, a central passageway 20 may be provided through the shank portion 16 of each link. This passage may be used, for example, for pressure lubricating purposes.

The link assembly of the embodiment of FIGURE 5 is designated generally as 30. This latter link assembly is made up of a plurality of links 32 which, as shown in FIGURE 6, includes a shank portion 34.

In the embodiment of FIGURES 5–8, a plurality of involute gear teeth 36a are formed at one end of the shank 34. A second plurality of involute gear teeth 36b are formed at the opposite end of the shank. The teeth 36a and 36b extend longitudinally, as in the previous embodiment, and are also displaced radially from the longitudinal axis of the shank.

In the embodiment under consideration, the teeth 36a are formed integral with a ball 40 which is positioned in the teeth and encompassed thereby. The teeth 36b, on the other hand, are configured to have a spherical shaped outer face, so that the faces of all the teeth 36b cooperate to form a spherical surface. These latter teeth are surrounded by a sleeve member 42 which is formed integral with the shank 34.

To form the assembly of FIGURE 5, the teeth 36b and enclosing sleeve 42 are moved over the ball 40 and teeth 36a of the next adjacent link. The sleeve 42 and teeth 36b are then simultaneously formed over the ball 40 and over the teeth 36a. The teeth 36a have outer faces configured to define a spherical surface, and the resulting shape of the sleeve 42 is spherical as it is formed down over the teeth 36a and 36b. The adjacent links are, therefore, coupled together by virtue of the forming of the teeth 36b over the ball 40, and also by forming the sleeve 42 over the teeth 36a.

It will be appreciated that although the ball 40 adds strength to the assembly of FIGURE 5, it is not naturally required in performing a coupling function between the links. In the assembly of FIGURE 9, the ball is dispensed with, and the involute gear teeth at one end of each link are formed around any appropriate central member.

The link assembly of FIGURE 9 is designated generally as 50. As in the previous embodiment, the assembly 50 is made up of a plurality of links which are designated 52 in FIGURES 10, 11 and 12. The links 53 have involute gears 54a formed at one end around an appropriate central member 55. These links are formed integral with a shank 56, and the other end of the shank includes an integral sleeve 58. The sleeve 58 surrounds a plurality of involute gear teeth 54b.

As in the previous embodiment, the outer faces of the teeth 54a are configured to define a spherical surface. Then, to assemble the link assembly 50, the sleeve 58 is drawn over the outer surfaces of the teeth 54a so that the inner surface of the sleeve 58 is formed into a spherical shape. In this manner, the links of the assembly 50 are positively coupled to one another.

It will be noted that the illustrated links are provided with four teeth at each end. However, as noted above, any desired number of teeth may be used. Also, and as previously mentioned, the teeth at the respective ends of each link are offset angularly to bear a staggered relationship with one another. This, as explained, assists in the lengthwise cold forming of the teeth.

It will be noted that the sleeves, such as the sleeves 58 in the embodiment of FIGURES 9–12 additionally form external bearing surfaces, these sleeves are appropriate for engaging the inner surface of a surrounding flexible hose which may be used to provide a housing for the assembly.

The invention provides, therefore, an improved link assembly which is strong and rugged in its construction. As described above, the link assembly of the invention may be used as a chain, or it may be used as flexible shafting.

When used as a chain, the link assembly exhibits an extremely high tensile strength; this being due to the positive coupling by the coupling sleeves or balls, in addition to the intermeshing of the gear teeth themselves.

When used as flexible shafting, the improved link assembly of the invention is advantageous in that it is capable of transmitting high torque forces with a minimum of backlash.

In addition to the features and advantages of the invention, as outlined above, the assemblies of the invention may be fabricated quickly and efficiently, and by relatively inexpensive fabricating equipment.

While particular embodiments of the invention have been shown and described, modifications may be made, and it is intended in the claims to cover all such modifications as fall within the scope of the invention.

What is claimed is:

1. A link for a link assembly comprising: a shank portion, a plurality of longitudinally extending involute gear teeth formed at each end of said shank portion, said involute gear teeth being angularly positioned about the longitudinal axis of said shank portion, said teeth at at least one end of said shank portion having configured outer faces cooperating to define a spherical surface, and a sleeve having an inner surface of a spherical configuration formed integral with at least one end of said shank and surrounding the teeth at said one end.

2. The link defined in claim 1 in which the teeth at one end of said shank are offset angularly from the teeth at the other end of said shank.

3. A link assembly including a plurality of links coupled to one another at the respective ends thereof, said links each including at each end a plurality of longitudinally extending involute gear teeth curved to define a spherical surface, said teeth being angularly positioned about the longitudinal axis of the link and spaced radially therefrom, said teeth at each end of each link meshing with the teeth at the adjacent end of an adjacent link throughout a predetermined angular range, and coupling means in engagement with the teeth of the adjacent ends of the adjacent links for holding the teeth of the adjacent ends of the adjacent links in meshed relationship with one another, said coupling means comprising a sleeve-shaped member having a spherical shaped inner surface positioned over the gear teeth at the adjacent ends of the adjacent links and engaging such gear teeth.

References Cited in the file of this patent

UNITED STATES PATENTS 1,739,756    Granville _____ Dec. 17, 1929

FOREIGN PATENTS 24,951    Great Britain _____ 1895